United States Patent Office 3,160,518
Patented Dec. 8, 1964

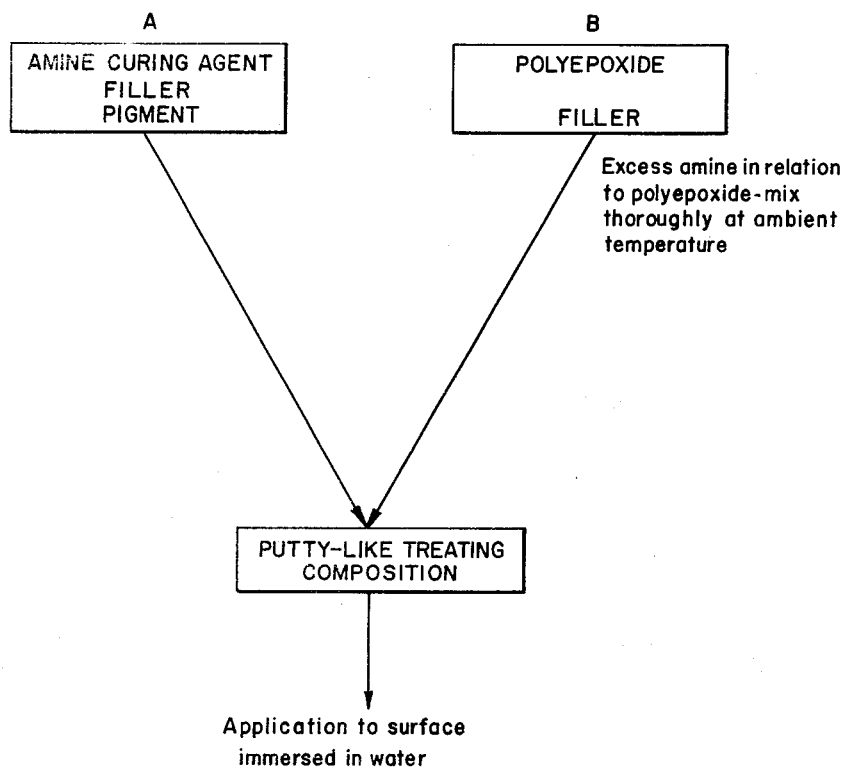

3,160,518
PROCESS FOR TREATING AND REPAIRING SURFACES IMMERSED IN WATER
Robert M. Jorda, Houston, Tex., assignor to Shell Oil Company, New York, N.Y., a corporation of Delaware
Filed Sept. 21, 1961, Ser. No. 139,604
20 Claims. (Cl. 117—94)

This invention relates to a new process for treating wet surfaces and to the resulting products. More particularly, the invention relates to a new process for treating water wetted surfaces to apply a corrosion-resistant coating thereto and/or repair defects in the said surfaces, and to the products prepared thereby.

Specifically, the invention provides a new and highly efficient process for applying a hard, tough and highly flexible resinous material to water wetted surfaces, and preferably metal surfaces, which material provides protection against corrosion and/or repairs defects so as to render the surface water tight. This process comprises applying to the water wetted surface a composition comprising a mixture of a polyepoxide having more than one vic-epoxy group and being free of groups highly reactive to water, and preferably a glycidyl polyether of an unsubstituted polyhydric phenol, and an excess amount of a material which acts both as a surface active material to "dry" the surface and as a curing material for the polyepoxide, and preferably an organic polyamine.

As a special embodiment, the invention provides a new process for applying a hard, tough and highly flexible corrosion-resistant coating to metal surfaces of off-shore structures which are in the vicinity of the water line and may be highly corroded, such as, for example, metal supports of off-shore drilling platforms, which comprises forming a putty-like mixture of a polyepoxide as described above and an excess of a material as an aliphatic or cycloalyphatic polyamine or derivatives thereof, and a thixotropic material, and then applying the putty-like material to the surface while submerged below the water, and allowing the coating to set hard while under the surface of the water.

This application is a continuation-in-part of my application Serial No. 61,063, filed October 7, 1960, now abandoned.

There is a growing need in industry for a superior plastic coating material that can be applied to surfaces while wet or while submerged under water so as to repair defects therein and/or apply a corrosion-resistant coating thereto. This includes, for example, repair of leaks in water lines without interruption of the water flow, repair of electrical conduits buried in wet soil, repair of boat hulls while the boat is still in the water, repair of water-wetted surfaces of pressure vessels, and the like, as well as applying corrosion-resistant coatings to the aforedescribed materials.

One of the greatest problems has been the prevention of corrosion of metal members of off-shore drilling structures, particularly those parts disposed in the splash zone, i.e., disposed in the vicinity of the water line. The corrosion of metal members in this area is particularly severe. If a metal member extends from the bottom to a point above the water level, the general pattern of its relative losses of metal due to corrosion usually has the following general characteristics; the corrosion rate is relatively low along those portions of the metal member which is within and immediately above the bottom sediments in which the member is disposed. Proceeding upwardly through the zone between the mud line and the low-tide water level, the rate of corrosion undergoes a relatively sudden and severe increase along a portion of the metal member which is located just below the low-tide water level and is generally continuously submerged. Further up, the corrosion rate may drop off along a short section between the low-tide and high-tide water levels, and then increase to a rate which usually exceeds the corrosion rate anywhere else along the metal member, this maximum being within the zone in which the member is subject to the action of waves. Above this zone, the metal member is subjected to atmospheric corrosion in which the metal is in contact with the moist air and some spray action normally existing above a body of water. The corrosion rate is high, and corrosion protection is needed along all of the portions of such metal members which are wetted and exposed to relatively high oxygen concentrations. Such portions include those portions of the metal which are substantially continuously immersed in water which has a relatively high concentration of dissolved and/or entrained oxygen.

It is known that those portions of metal members which are located well above the water line may be adequately protected against corrosion by the application thereto of conventional marine paints. Similarly, the use of impressed cathodic as well as of sacrificial anodic protection techniques have been found to provide adequate protection of the corrodible metal members located well below the water line. However, several factors make it exceedingly difficult to protect those portions of corrodible metal members which are located in the vicinity of the water line. This is a zone in which waves and tides produce rather strong currents which cause rapid erosion of most non-metallic coatings normally applied to the metal surfaces. It is essential that corrosion protective materials be applied to those portions of the corrodible metal members which extend at least about a foot, or frequently even further below the low-tide level. The problem of applying such production to metal member portions which are located under water is further aggravated by the presence of crossbracing at or very close to the water line.

It was previously demonstrated that some simple off-shore structures, e.g., wellheads mounted on unbraced surface conductors, may be protected against corrosion by enclosing the underwater portions thereof which are near the water line by means of a caisson-type structure, removing the water from the caisson-type structure, and then applying a plastic coating by any of the well-known conventional marine application procedures. Although the cost of the materials which are used in this caisson technique is quite low, the use of this technique is rather expensive due primarily to the time necessary for effecting said corrosion inhibition technique. Also, the application of this technique becomes unfeasible, complex and difficult when the structure to be thus protected has crossbracing and the like at or near the water line, e.g., where the aforesaid corrosion protection is to be applied.

Similar disadvantages are inherent in other more recently proposed treatment processes, such as, surrounding the corrodible metal members with a corrosion-resistant sleeve, then removing the water between the member to be protected and the sleeve, and finally filling the void thus formed with a corrosion-resistant sealing material construction or coating the structural members which are to be disposed at or near the water line with corrosion-resistant metals or plastics; or placing a sleeve around the metal member, which sleeve is filled with porous materials which keep the metal members continuously wetted with an electrolyte, and effecting corrosion inhibition by means of a sacrificial metal anoid arrangement.

It is an object of the invention therefore to provide a new process for treating wet surfaces. It is a further object to provide a new low-cost process for applying a corrosion-resistant coating to a water wetted surface. It is a further object to provide a new process for applying a corrosion-resistant coating to already corroded metal surfaces while immersed in water. It is a further object to provide a new process for applying a coating to well surfaces which render the surface resistant to corrosion by fresh or saline water. It is a further object to provide an easy method for applying a protective coating to complicated structural members of off-shore drilling platforms which are disposed in the vicinity of the water line. It is a further object to provide a new process for applying a coating which is hard and tough to wet surfaces. It is a further object to provide an economical and highly efficient process for treating surfaces which are under salt water. It is a further object to provide a new process for treating wet surfaces to repair defects therein. It is a further object to provide a new process for treating wet surfaces to make them water tight and corrosion resistant. These and other objects of the invention will be apparent from the following detailed description thereof and from the attached drawing which is a flow diagram illustrating one preferred method of preparing the new compositions and using the compositions for treating surfaces immersed in water.

It has now been discovered that these and other objects may be accomplished by the process of the invention which comprises applying to the water wetted surface a composition comprising a mixture of a polyepoxide having more than one vic-epoxy and being free of groups which are highly reactive to water and preferably a glycidyl polyether of an unsubstituted polyhydric phenol, and an excess amount of material which acts both as a surface active material to "dry" the surface and to convert the polyepoxide to an insoluble material, and preferably an organic material possessing a plurality of amino hydrogen, and especially an alphatic or cycloaliphatic polyamine, or derivative thereof, and allowing the composition to set hard. It has been found that by the use of this process one can very easily apply corrosion-resistant coatings to surfaces which are wet or even totally submerged underwater. The application is particularly efficient when applied as a putty to surfaces while they are under water. The coatings have excellent adhesion to the surface even when they are under water and tough. The coatings when cured also demonstrate outstanding resistance to corrosion by fresh water, saline water, moist air and the like. In addition, the coatings are very hard and tough and have flexibility and distensibility. They thus can be subjected to considerable pressures without chipping or cracking.

It has also been surprisingly found that the process is effective for repairing defects in wet surfaces, such as holes, cracks, pits and the like. When the compositions are applied to the surfaces when wet or submerged under water, the coatings fill the holes or cracks and can be leveled to form a smooth coating. The process can thus be used both for repair and for application of corrosion resistant coatings to boat hulls, water pipes, electrical conduits, pilings and the like.

It also has been unexpectedly found that the new compositions are excellent materials for treating heat exchange tubes, heat exchange tube sheets, heads and the like. The compositions form a strong corrosion resistant coating when applied thereto according to the process of the invention. In addition, it was surprisingly found that the resulting coatings inhibit the formation of mineral scale depositions during operation of the heat exchanger.

The theory which I developed for the obtaining of the above-described superior results has been confirmed by laboratory tests. The use of the excess amount of the above-noted surface active curing agents brings about a displacement of the water molecules at the interface of the surface and coating composition and permits the formation at that point of the superior adhesive forces which bond the cured composition to the surface. The affinity of the special surface active curing materials to the metal or other surface is greater than the affinity of water to such surfaces and thus, the special surface active curing agents displace the water to provide an essentially water free surface onto which the coating can bond. It has been shown that only if the surface active curing agents are available as an excess over the stoichiometric amount will the essential "drying" of the surfaces occur.

The polyepoxides used in the process of the invention comprise those organic materials possessing more than one vic-epoxy group, i.e., more than one

group and having no groups highly reactive to water. These materials may be saturated or unsaturated, aliphatic, cycloaliphatic, aromatic or heterocyclic. They should not, however, possess groups, such as isocyanate groups, which are highly reactive towards water.

For clarity, many of the polyepoxides and particularly those of the polymeric type will be described in terms of epoxy equivalent value. The meaning of this expression is described in U.S. 2,633,458.

If the polyepoxide consists of a single compound and all of the epoxy groups are intact, the epoxy equivalency will be integers, such as 2, 3, 4 and the like. However, in the case of polymeric type polyepoxides many of the materials may contain some of the monomeric monoepoxides or have some of their epoxy groups hydrated or otherwise reacted and/or contain macromolecules of somewhat different molecular weight so that epoxy equivalent values may be quite low and contain fractional values. The polymeric material, may, for example, have epoxy equivalent values, such as 1.5, 1.8, 2.5 and the like.

Examples of the polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-methoxy-3,4-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-methoxy-3,4-epoxybutoxy)benzene, and
1,4-bis(2-methoxy-4,5-epoxypentoxy)benzene.

Other examples include the epoxy polyethers of polyhydric phenols obtained by reacting a polyhydric phenol with a halogen-containing epoxide or dihalohydrin the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bisphenol-A), 2,2-bis(4-hydroxyphenol)butane, 4,4'-dihydroxybenzophenone, bis-(4-hydroxyphenyl)ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

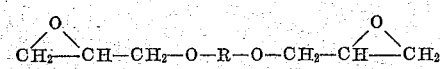

wherein R represents a divalent hydrocarbon radical of the dihydric phenol. The polymeric products will generally not be a single simple molecule but will be a complex mixture of glycidyl polyethers of the general formula

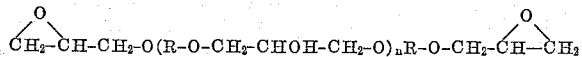

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number as noted above.

The aforedescribed preferred glycidyl polyethers of the dihydric penols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of dihydric phenols will be illustrated below. Unless otherwise specified, parts indicated are part by weight.

PEPARATION OF GLYCIDYL POLYETHERS OF DIHYDRIC PHENOLS

Polyether A

1 Mol of bis-phenol was dissolved in 10 mols of epichlorohydrin and 1 to 2% water added to the resulting mixture. 5% by weight phenol was added to the mixture. The combined mixture was then placed in a kettle provided with heating and cooling means, agitator, distillation condenser and receiver. The mixture was brought to 80° C. and 2 mols of solid sodium hydroxide added in small portions. Sufficient cooling is applied during the addition so that the temperature is maintained at about 95–97° C. and there is a gentle distillation of epichlorohydrin and water. After the last addition of sodium hydroxide with the completion of the reaction, the excess epichlorohydrin is removed by vacuum distillation. After completion of the distillation, the residue is cooled to about 90° C. and about 300 parts of benzene added. Cooling drops the temperature of the mixture to about 40° C. with precipitation of salt from the solution. The salt is removed by filtration and the removed salt carefully washed with about an additional 300 parts of benzene to remove polyether therefrom. The two benzene solutions were combined and distilled to separate the benzene. When the kettle temperatures reached 125° C., vacuum distillation is applied. The resulting product is a liquid composition containing glycidyl polyether of bisphenol having the following properties: Epoxy value of 0.541 eq./100 g., color 6 (Gardner), chlorine (percent w.) 0.24, viscosity 70 poises.

Polyether B

A solution consisting of 11.7 parts of water, 1.22 parts of sodium hydroxide, and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durran's Mercury Method and a molecular weight of 483. The product had an epoxy value eq./100 g. of 0.40. For convenience, this product will be referred to as Polyether B.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 250 and 900. Particularly preferred are those having a Durran's Mercury Method softening point no greater than 80° C.

The glycidyl polyethers of polyhydric phenols obtained by condensing polyhydric phenols with epichlorohydrin as described above are also referred to as "ethoxyline" resins. See Chemical Week, vol. 69, page 27, for September 8, 1951.

Another group of polyepoxides that may be used comprises the glycidyl ethers of novolac resins which resins are obtained by condensing an aldehyde with a polyhydric phenol. A typical member of this class is the epoxy resins from formaldehyde 2,2-bis(4-hydroxyphenyl) propane novolac resin.

The material to be used to combine with the above-described polyepoxides in the process of the present invention comprise material which act both as a surface active material to "dry" the surface as a material to convert the polyepoxide to an insoluble infusible form. Preferred materials include those organic materials possessing a plurality of amino hydrogen, i.e., a plurality of

groups wherein N is an amino nitrogen. These include the aliphatic, cycloaliphatic, aromatic or heterocyclic polyamines as well as derivatives thereof as long as the derivatives still contains the necessary amino hydrogen.

Examples of these materials include, among others, the aliphatic polyamines, such as, for example, ethylene diamine, diethylene triamine, triethylene tetramine, tetraethylene pentamine, 1,4-aminobutane, 1,3-diaminobutane, hexamethylene diamine, 3-N-isopropylamino)propylamine, N,N'-diethyl-1,3-propanediamine, hexapropylene heptamine, penta(1-methyl-propylene)hexamine, tetrabutylenepentamine, hexa-(1,1-dimethylethylene)-heptamine, di(1-methylbutylene)triamine, pentaamylhexamine, tri(1,2,2-trimethylethylene) tetramine, tetra(1,3-dimethylpropylene)pentamine, penta(1,5-dimethylamylene)hexamine, penta-(1,2-dimethyl-1-isopropyl-ethylene)hexamine and N,N'-dibutyl-1,6-hexanediamine.

Aliphatic polyamines coming under special consideration are the alkylene polyamines of the formula

wherein R is an alkylene radical, or a hydrocarbonsubstituted alkylene radical, and $n$ is an integer of at least one, there being no upper limit to the number of alkylene groups in the molecule.

Especially preferred aliphatic polyamines comprise the polyethylene polyamines of the formula

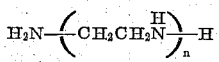

wherein $n$ is an integer varying from about 2 to 8. Coming under special consideration are the polyethylene polyamines comprising 20–80% by weight of polyethylene polyamines having average molecular weights in the range of 200–500. These high molecular weight polyethylene polyamines normally start with tetraethylene pentamine and having related higher polymers which increase in complexity with increasing molecular weights. The remaining 80–20% of the mixture is diethylene triamine employed in such proportions that the mixture is fluid at about room temperature (60–90° F.).

The mixture of high molecular weight polyethylene polyamines is normally obtained as a bottom product the process for the preparation of ethylene diamine. Consequently, it normally constitutes a highly complex mixture and even may include small amounts (less than about 3% by weight) of oxygenated materials. A typical mixture of polyethylene polyamines diluted with about 5% diethylene triamine has the following analysis:

| | |
|---|---|
| Percent by weight carbon | 51.5 |
| Percent by weight nitrogen | 34.3 |
| Percent by weight hydrogen | 11.6 |
| Percent by weight oxygen | 2.5 |

Total basicity, equivalents per 100 grams=1.98, equivalent to 27.7% nitrogen.

| | | |
|---|---|---|
| Active nitrogen | percent | 81 |
| Viscosity | poises | 75–250 |
| Equivalent weight | percent | 42.5 to 47.5 |

This mixture of polyamines will be referred to hereinafter as Polyamine H.

Other examples include the polyamines possessing cycloaliphatic ring or rings, such as, for example, 1-cyclohexylamino-3-aminopropane, 1,4-diaminocyclohexane, 3-diaminocyclopentane, di(aminocyclohexyl)methane, (aminocyclohexyl)sulfone, 1,3 - di(aminocyclohexyl) propane, 4-isopropyl-1,2-diaminocyclohexane, 2,4-diaminocyclohexene, N,N'-diethyl-1,4-diaminocyclohexane, and the like. Preferred members of this group comprise those polyamines having at least one amino or alkyl-substituted amino group attached directly to acycloaliphatic ring containing from 5 to 7 carbon atoms. These cycloaliphatic amines are preferably obtained by hydrogenating the corresponding aromatics amine. Thus di(aminocyclohexyl)methane is obtained by hydrogenating ethylene dianiline.

Another group of materials that may be used in process of the invention comprise the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkoxysilyl-propylamines as triethoxysilylpropylamines.

Still another group comprise the aminoalkyl-substituted aromatic compounds, such as, for example, di(aminoethyl)benzene, di(aminomethyl)benzene, tri(aminoethyl)benzene, tri(aminobutyl)naphthalene and the like.

Still another group comprise the polymeric polyamines, such as may be obtained by polymerizing or copolymerizing unsaturated amines, such allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, copolymer of octadecene-1 and methyl acrylate, and then reacting this with a polyamine so as to effect an exchange of an ester group for an amide group and leave the other amine group or groups free. Polymers of this type are described in U.S. 2,912,416.

Still other materials include the N-(aminoalkyl)piperazines, such as, for example, N-aminobutylpiperazine, N-aminoisopropyl-3-butoxypiperazine, N-aminoethylpiperazine, 2,5-dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cure obtained, are the acetone soluble derivatives of the above polyamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl, 1,2-epoxypropionate and the like.

This reaction between the polyamines and monoepoxide is effected by merely bringing the components together in proper proportions. The adducts are obtained when a mole of the polyamine is reacted with not more than one mol of monoepoxide. The excess amine can be retained or removed by distillation. Examples of the monoepoxide-polyamine reaction products include, among others, N(hydroxypropyl) diethylene triamine (reaction product of propylene oxide and diethylene triamine) and N(2-hydroxy-4-phenoxypropyl) diethylene triamine (reaction product of phenyl glycidyl ether and diethylene triamine).

A group of related materials are those soluble fusible products obtained by reacting a polyepoxide with a monoamine. Examples of polyepoxides that may be used include any of those noted above for use in the compositions of the present invention. Examples of the monoamines include, among others, secondary amines as dimethylamine, diethylamine, dipropylamine, dibutylamine, di(tert-butyl)amine, dinonylamine, dicyclohexylamine, diallylamine, dibenzylamine, methylethylamine, ethylcyclohexylamine and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Another group of derivatives that may be used in the process of the invention include those soluble and fusible products obtained by reacting the polyamines noted above with unsaturated nitriles, such as, acrylonitrile. Examples of such products include the cyanoethylated diethylene triamine, cyanoethylated triethylene tetramine, cyanoethylated hexamethylene diamine, cyanoethylated 1,3-propane diamine and cyanoethylated 1,3-diaminocyclohexane. Preferred species of the cyanoalkylated polyamines include those of the formula

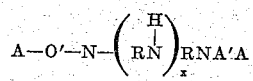

wherein $x$ represents an integer in the range of 0 through 3 and A and A' represent a member selected from the group consisting of hydrogen and cyanoethyl radicals, and further characterized in that the amine has at least one cyanoethyl group and at least one nontertiary amino group in the molecule. Especially preferred members of this group comprise the cyanoethylated aliphatic and cycloalipathic polyamines containing up to 18 carbon atoms.

Other suitable materials include the imidazoline compounds as prepared by reacting monocarboxylic acids with polyamines. These may be represented by the formula

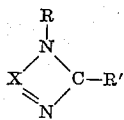

wherein X is an organic radical, and preferably an alkylene radical, R' is a long chain hydrocarbon radical, and preferably one containing at least 12 carbon atoms, and R is an organic radical containing an amine or amine substituted group. Particularly preferred members of this group are those obtained by reacting any of the above-described polyamines with long chain monocarboxylic acids, such as those containing at least 12 and preferably 16 to 30 carbon atoms, such as, for example, palmitic acid, pentadecanoic acid, 4-ketomyristic acid 8,10-dibromostearic acid, margaric acid, stearic acid, alpha-chlorostearic acid, linoleic acid, oleic acid, dihydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about .3 to .7 to 1, and preferably about .3 to .5 to 1. The temperature employed preferably varies from about 100° C. to 250° C.

Still other examples include the sulfur and/or phosphorus-containing polyamines, such as may be obtained by reacting a mercaptan or phosphine containing active hydrogen with an epoxy halide to form a halohydrin, dehydrochlorinating and then reacting the resulting compound with a polyamine. N-(3-ethylthio-2-hydroxypropyl) diethylene triamine may be prepared, for example, by reacting ethyl mercaptan with epichlorohydrin, dehydrochlorinating and then reacting the resulting epoxy compound with diethylene triamine. Suitable examples of such compounds include, among others, N-(3-butylthio-2-hydroxypropyl) triethylene tetramine, N-(4-phenylthio-3-hydroxybutyl) pentamethylene tetramine, N-(4-cyclohexylthio-3-hydroxybutyl)ethylene diamine, N-(3-cyclohexylthio-2-hydroxypropyl)hexamethylene diamine, N-(3-diphenylphosphino - 2 - hydroxypropyl)triethylene tetramine, N - (3 - dicyclohexylphosphino-2-hydroxypropyl)pentamethylene tetramine, N - (3 - diododecylphosphino-3-hydroxyhexyl)diethylene triamine, and 3-(allylthio - 2 - hydroxypropyl)hexamethylene diamine. Coming under special consideration are the N(alkylthiohydroxyalkyl) aliphatic and aromatic polyamines, the N-(cycloalkylthiohydroxyalkyl) aliphatic and aromatic polyamines and the N-(arylthiohydroxyalkyl) aliphatic and aromatic polyamines. Preferred phosphorus-containing curing agents include the N-(dialkylphosphinohydroxyalkyl) aliphatic and aromatic polyamines, the N - (dicycloalkylphosphinohydroxyalkyl) aliphatic and aromatic polyamines, and the N-(diarylphosphinohydroxyalkyl) aliphatic and aromatic polyamines.

Still other derivatives that may be employed include those obtained by reacting the polyamines with acrylates, such as methyl acrylate, ethyl acrylate, methyl methacrylate and the like. In this case there is an exchange of the ester linkage for an amide linkage, one of the polyamine nitrogen being involved in the said amide linkage.

Particularly preferred polyamines and derivatives to be used with the above-described polyepoxides comprise the aliphatic and cycloaliphatic polyamines of the formula

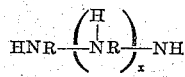

wherein $x$ is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acids containing up to 20 carbon atoms.

Other materials may also be included in the compositions of the present invention. Materials which are particularly desirable for use, especially when the coatings are to be applied while the surface is immersed under water, are those which impart thixotropic properties to the composition. Examples of these include, among others, silicas, silicates, non-fibrous asbestos, silica aerogels, montmorillonite clay minerals as bentonite and the like. These materials are preferably finely divided and preferably have particles of up to 50 microns in size. Particularly preferred materials to be utilized include the finely divided colloidal materials which swell in the presence of water, and especially those having a heat of interaction with the polyepoxide of less than 300 ergs/sq. cm. These thixotropic materials are preferably utilized in amounts up to about 10% by weight of the combined mixture, and still more preferably in amounts varying from about 0.1% to 5% by weight.

Other materials to be added also include inert fillers, such as sand, crushed shells, rocks, aluminum powder, iron particles and the like.

Other materials that may be used in the composition include those which tend to extend the polyepoxide but do not seriously affect the properties of the cured product, such as, for example, coal tars, asphalts, road oils, extracts and distillates, middle oil, refined coal tars, pine tars and oil, and the like as well as other types of resins as phenol-aldehyde resins, phenol-urea resins, polythiopolymercaptans, vinyl resins, polyolefins, synthetic rubbers, and the like and mixtures thereof. Particles of solid resins as particles of nylons, rayons, Dacrons, and the like may also be added for added strength. These other materials are preferably employed in amounts less than 60% by weight of the polyepoxide, and more preferably not more than 40% by weight of the polyepoxide.

Other materials that may be used include pigments, plasticizers, stabilizers, fungicides, insecticides, activators for the cure of the epoxy resins, such as, for example, phenols, amines, acids, salts, thiols, sulfides, and the like, and mixtures thereof. Other types of curing agents for the polyepoxides may also be used in combination with the above-noted polyamides as long as the polyamides make up at least 50% by weight of the combined curing agent.

The proportions of the polyepoxide and the material having the amino hydrogen used in the compositions may vary within controlled range. The amount of the material possessing the amino hydrogen should be at least a 5% stoichiometric excess and as used herein as in the appended claims stoichiometric amount refers to that amount needed to furnish one amino hydrogen for every epoxy group to be reacted. Particularly superior results are obtained when the polyamide is employed in from 5% to 50% stoichiometric excess. The amount should preferably not be greater than 100% stoichiometric excess and still more preferably not more than 50% stoichiometric excess.

The compositions may be prepared by any suitable method. They may be prepared, for example, by merely mixing the polyepoxide and material possessing amino hydrogen together in the above-noted proportions along with any of the above-described materials, such as fillers, thixotropic agents, pigments and the like. It is sometimes desirable to prepare the polyepoxide along with fillers, thixotropic agents, pigments and the like in a separate composition and the material possessing amino hydrogen in a separate composition along with desired fillers, thixotropic materials and pigments, and then mix the two compositions together just before application is needed. This is preferred as it gives more time to work with the composition before it sets up to the hard insoluble material.

A preferred method of preparing the compositions is illustrated in the attached drawing and in Example I. In this case, the amine curing agent, filler and pigment are combined as Composition A and Composition B is prepared by mixing the polyepoxide, and filler. Compositions A and B are then mixed in such proportions as to have an excess of the amine in relation to the polyepoxide and the mixing is accomplished at ambient temperature. The resulting putty-like composition is then applied to the surface immersed in water.

The viscosity of the compositions used in the process of the invention will depend upon the viscosities of the polyepoxide and material possessing amino hydrogen used in the mixture and the amount of added fillers and the like added. If thicker more putty-like compositions are needed, they may be prepared by the addition of more fillers or thixotropic agents. In general, putty-like compositions are obtained by adding from 20% to 150% by weight of the polyepoxide and material possessing amino hydrogen of the filler materials. On the other hand, if more fluid compositions are needed as for brushing, etc. one may add more fluid polyepoxides, such as, for example, glycidyl ethers of polyhydric alcohols, diglycidyl ether, polyglycidyl esters of lower acids and the like, until the desired fluidity is obtained.

The above-noted compositions are applied to the water-wetted surface when the surface is in contact with any amount of water, e.g., the surface may just have a layer of water say several molecules thick, or the surface may be totally immersed in fresh or saline water. When the surface is in contact with only a small amount of water, the composition may be applied by simply brushing, spraying or otherwise applying the composition. However, when the surface is under water and exposed to considerable movement of the water, a putty-like mixture is prepared and applied to the surface as by hand or other suitable techniques so as to force the composition on the surface to be coated and form a continuous layer thereon.

The thickness of the coating on the surface will depend on the desired need of the application. The coating may, for example, vary from just a few mils thickness up to as high or higher than one inch thickness. The edges of the coatings are feathered down so as to make a secure seal on the surface.

If the surface to be coated has already been corroded or is coated with oils and the like, it is preferred to clean the surface before application of the coatings of the invention. This may be accomplished by any suitable means, such as steel brushing, sandblasting, etching with acids, cleaning with organic solvents and the like.

After the material has been coated with the desired coating, the coating is then allowed to set until it has become cured to the insoluble infusible state, e.g., is insoluble in acetone and does not soften when heated say to 100° C. The curing takes place at normal temperatures so no external steps need be taken to effect cure. Heat, of course, will speed the cure, and if possible applications, such as heat lamps and the like, might be utilized to speed the setting up of the coating. Under ordinary application conditions, the coating will generally harden by being allowed to set in a few hours after mixing.

The process of the invention is particularly adapted for use in the protection of metal structures disposed offshore and subjected to the action of an electrolyte, such as sea water, this process including the steps of mixing a polyepoxide and filler material which proportions are selected to form a putty-like composition which preferentially wets metal surfaces and becomes substantially rigid in say from 30 minutes to 24 hours after mixing, and applying a coating of said putty-like composition on surfaces of metal members to be protected, which surfaces are located between the upper level reached by waves and a level at least one foot below the low-tide water line, by forcing said putty-like composition to contact said metal surfaces and form into a continuous layer along which there is substantially continuous composition-to-metal contact.

In treating a vertical metal member which extends through the water line of an offshore structure, the surfaces of the member to be protected are cleaned from a level as high as the anticipated lapping of the waves, or splashing of the water, to a level which is at least about a foot below the low-tide water line, said cleaned surface being then coated with a layer of the aforesaid self-hardening mixture.

One of the preferred methods of applying the mixture to the structural member is to first form a ring of the material or mixture on the structural member at a point somewhat above the highest point to which water may splash, then smearing the material downwardly and uniformly a foot or so below the low-tide water level with the bottom edge of the plastic feathered to the metal member to be protected. The composition used for this protection of metal structural members is readily molded in place by the use of the applicators hands, particularly when the latter are wet. The application of the subject compositions to complex geometric structures is easy and readily accomplished by the use of techniques similar to those employed in applying putty.

As noted, the process of the invention is also particularly adapted for use in the repairing of defects in surfaces, such as holes cracks and the like and optionally placing of a corrosion resistant coating on such surface at the same time. This is accomplished by preparing the composition as noted above and then applying the composition to the defective surface. If the defects are very fine cracks, and the wet surfaces are not exposed to much action of the water, the composition may be of the fluid type so as to fill the cracks and defects. If the cracks are very large and/or if the action of the water is very strong it may be necessary to employ the composition in the form of a thick putty as described above. After the composition has been applied to the defect so as to effect the repair, the surface may then be coated to effect the direct corrosion prevention. In some cases, in repairing the defects in the presence of water, it may be desirable to speed the cure of the composition so as to more efficiently close the crack or hole. This may be accomplished by the addition of cure accelerators noted above, such as phenols, thiols and the like.

The process of the invention may be used for the coating and/or repair of any surface. Such surfaces include, among others, wood, cement, plaster, metal, silicas, glass and the like. The process is particularly suited for use in treating metal surfaces, such as, for example, copper, aluminum, brass and iron surfaces. The process has shown especially superior results when used for the treatment of ferruginous metal surfaces. The surfaces may be in any type of structure, such as, for example, pipes, boats, pilings, reaction vessels, structural members of oil well drilling platforms, well jackets, collection platforms and the like.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE I

This example illustrates the preparation of a coating composition containing Polyether A and a diethylene triamine, and the use of this composition for treatment of off-shore drilling structures disposed in the splash zone.

Composition A was prepared by mixing the following components together in the following proportions (in parts by weight):

| | Parts |
|---|---|
| Diethylene triamine | 39 (50% excess) |
| Talc | 20 |
| Barites | 40 |
| Pigment | 1 |

Composition B was prepared by mixing the following components together in the following proportions:

| | Parts |
|---|---|
| Polyether A | 60 |
| Talc | 40 |

The two compositions were mixed together in substantially equal parts by volume. The resulting composition was a putty-like composition which could be easily formed by hand and when allowed to stand set up to a hard tough insoluble infusible material.

The above uncured composition was applied by hand to the steel legs of the well jacket and the flowline of an off-shore drilling platform located in ocean water where severe splash zone corrosion was taking place. The surfaces had been previously scraped and wire brushed to remove most of the rust. The coating was applied to cover the area in the spray zone, at the splash zone and about one foot below low tide water level. The composition was applied under the water line by applying pressure to squeeze the water away from the member and establish a substantially continuous composition-to-metal contact under the layer of the coating material. No difficulty was encountered in having the coating adhere to the members and the plastic coating was fully cured in several hours to form a hard tough coating.

The coatings on the well jacket and flowline were inspected months after application and were found to be in excellent condition. The coatings had withstood considerable pressures and because of its great distensibility had not chipped or pealed off. The adhesion was excellent and the coatings were providing complete corrosion protection to the members.

EXAMPLE II

This example further illustrates the preparation and use of a coating composition containing Polyether A and Polyamine H described above.

Composition A is prepared by mixing the following components together in the proportions indicated:

| | Parts |
|---|---|
| Polyether A | 40.4 |
| Triphenyl phosphite | 3.7 |
| Cab-osil (thixotropic agent) | 47.5 |
| Chrome yellow pigment | 3.4 |
| | 100.0 |

Composition B is prepared by mixing the following components together in the proportion indicated:

| | Parts |
|---|---|
| Polyamine H | 42.3 |
| Silica filler | 12.7 |
| Cabo-sil (thixotropic agent) | 44.0 |
| Lamp black | .2 |
| | 100.0 |

Compositions A and B are then mixed together in a weight ratio of 100:23. The resulting mixture is a putty-like composition which could be easily formed by hand. When allowed to set, the mixture sets up in a few hours to form a hard tough insoluble infusible material.

The above uncured composition is applied by hand to a steel pipe disposed in an accelerated splash zone corrosion test apparatus. The pipe has been previously cleaned by sandblasting and the coating is applied by hand under 3% brine solution. The coating remains intact with no slumping or running and sets to form hard tough coating in several hours. The pipe is retained in the apparatus where it is exposed to the brine solution under accelerated splash zone conditions for several days. The water is kept at 70° F. for 24 hours and then the temperature raised to 150° F. to accelerate the test. At the end of 7 days, the coating demonstrates excellent adhesion and toughness and excellent corrosion protection.

EXAMPLE III

Example II is repeated with the exception that the amount of polyamine H in the coating composition is changed to 50% excess. Related results are obtained.

EXAMPLE IV

Example II was repeated with the exception that Polyether A was replaced with an 85–15 mixture of Polyether A and butyl glycidyl ether. Related results are obtained.

EXAMPLE V

Example II is also repeated with the exception that Polyether A is replaced with diglycidyl ether of resorcinol. Related results are also obtained.

EXAMPLE VI

Example II is repeated with the exception that the Polyamine H is replaced with equivalent amount of 1-cyclohexylamino-3-aminopropane. Related results are obtained.

EXAMPLE VII

Example II is repeated with the exception that the polyamine H is replaced with an equivalent amount of N-aminoethyl piperazene. Related results are obtained.

EXAMPLE VIII

Composition A is prepared by mixing the following components in the proportions indicated:

| | Percent |
|---|---|
| 85–15 mixture of Polyether A and butyl glycidyl ether | 30 |
| Triphenyl phosphite | 6 |
| Asbestos | 12 |
| Aluminum powder | 10 |
| Phythalox amine blue | 3 |

Composition B is prepared by mixing the following components in the proportions indicated:

| | Percent |
|---|---|
| Diethylene triamine-ethyleneoxide adduct (N-(hydroxyethyl)diethylene triamine) | 30 |
| Aluminum powder | 10 |
| Yellow pigment | 1.7 |

The two compositions above are mixed together so as to give 100 parts of Composition A to 25 parts of Composition B. The resulting composition is a putty-like composition which can be easily formed by hand and when allowed to stand sets up to a hard tough composition.

The above composition is applied to the steel legs of a well jacket and flow line of an off-shore drilling platform as shown in Example I. The coating does not slump or run and sets hard under the water to form a hard tough coating. Examination of the coating after several months indicated the coating was in excellent condition, had not chipped or marred and had given complete protection against corrosion.

EXAMPLE IX

The coating compositions shown in Examples I, II and VIII are applied to iron and copper water piping which have water leaking through small holes. The coatings set up in a few hours to seal the holes and furnish a hard tough flexible corrosion-resistant coating for the pipes.

EXAMPLE X

The coating compositions shown in Examples I, II and VIII are also applied to the side of a metal hull of a boat while in the water so as to effect a repair of a small hole therein. A successful patching and coating of the hole is obtained.

EXAMPLE XI

Example I is repeated with the exception that the diethylene triamine is replaced with an equivalent amount of an adduct of diethylene triamine and acrylonitrile. Related results are obtained.

EXAMPLE XII

Example I is repeated with the exception that the diethylene triamine is replaced with an equivalent amount of hydrogenated metaphenylene diamine. Related results are obtained.

EXAMPLE XIII

Example I is repeated with the exception that the diethylene triamine is replaced with an equivalent amount of an imidazoline obtained by reacting diethylene triamine with oleic acid. Related results are obtained.

EXAMPLE XIV

Example I is repeated with the exception that the diethylene triamine is replaced with an equivalent amount of N-(3-ethylthio-2-hydroxypropyl) diethylene triamine. Related results are obtained.

EXAMPLE XV

Example I is repeated with the exception that the diethylene triamine is replaced with an equivalent amount of N-(3-dicyclohexylphospino-2-hydroxypropyl) diethylene triamine. Related results are obtained.

EXAMPLE XVI

Example I is repeated with the exception that diethylene triamine is replaced with an equivalent amount of hexylene diamine. Related results are obtained.

EXAMPLE XVII

Example I is repeated with the exception that diethylene triamine is replaced with an equivalent amount of hydrogenated, p,p-diaminediphenylsulfone. Related results are obtained.

I claim as my invention:

1. A process for applying a corrosion-resistant coating to a surface immersed in water which comprises applying to the surface while immersed in water a mixture of a liquid polyepoxide having more than one vic-epoxy group and containing only members of the group consisting of carbon, hydrogen, oxygen and chlorine, and at least 5% stoichiometric excess of a polyamine, and then allowing the coating to cure while the coated surface is immersed in water.

2. A process for forming a corrosion-resistant coating on a metal surface while the surface is immersed in water which comprises applying to the metal surface a putty-like mixture of a liquid polyepoxide containing only members of the groups consisting of carbon, hydrogen, oxygen and chlorine and having more than one vic-epoxy group and at least 5% stoichiometric excess of a polyamine, said polyamine having a greater affinity to the metal surface than the water and functioning as to replace the water from the surface of the metal and cure the polyepoxide, and allowing the mixture to harden under the water.

3. A process as in claim 2 wherein the polyepoxide is a glycidyl polyether of an unsubstituted polyhydric phenol having an epoxy equivalency of more than 1.0 and a molecular weight between 250 and 900.

4. A process as in claim 2 wherein the polyamine is an aliphatic polyamine.

5. A process as in claim 2 wherein the polyamine is a cycloaliphatic amine.

6. A process as in claim 2 wherein the polyamine is an adduct of a monoepoxide and a polyamine.

7. A process as in claim 2 wherein the polyamine is an adduct of an unsaturated nitrile and a polyamine.

8. A process as in claim 2 wherein the polyamine is an imidazoline comprising the reaction product of a monocarboxylic acid and a polyamine.

9. A process as in claim 2 wherein the polyamine is an adduct of a polyamine and an acrylate.

10. A process as in claim 2 wherein the polyamine is an adduct of a polyamine and a polyepoxide.

11. A process as in claim 2 wherein the polyamine is an alkoxysilylpropylamine.

12. A process as in claim 2 wherein the polyamine is an N-(aminoalkyl)piperazine.

13. A process as in claim 2 wherein the polyamine is a N-(alkylthiohydroxyalkyl)polyamine.

14. A process as in claim 2 wherein the polyamine is an aminoalkyl-substituted aromatic hydrocarbon.

15. A process for the protection of a structure which is disposed off-shore in saline water and has generally tubular ferruginous material structural members located within a zone partly below and partly above the water level, which comprises forming a mixture of a liquid polyepoxide having more than one vic-epoxy group and containing only members selected from the group consisting of carbon, hydrogen, oxygen and chlorine, an excess of a polyamine, and a thixotropic material, applying the resulting mixture to the aforedescribed structural members while immersed in water, and allowing the coating to set to a hard tough flexible coating while immersed in the water.

16. A process for repairing a defect in a wetted metal surface which comprises applying to the surface while under the water a composition comprising a mixture of (1) a liquid glycidyl polyether of an unsubstituted polyhydric phenol, (2) at least 5% stoichiometric excess of a polyamine, said polyamine having greater affinity to the metal surface than the water and functioning as to displace the water from the metal and cure the glycidyl polyethers, and (3) a thixotropic agent, and then allowing the composition to set to a hard tough plastic while under the water.

17. A process for applying a corrosion-resistant coating to surfaces immersed in water which comprises applying to the surface while immersed in water a mixture of (1) a liquid glycidyl polyether of an unsubstituted polyhydric phenol, (2) from 5% to 50% stoichiometric excess of an aliphatic polyamine, and (3) a finely divided colloidal silicon-containing material, and allowing the mixture to set hard while the coated surface is immersed in water.

18. A process for applying a corrosion-resistance coating to metal surface which is immersed in water which comprises applying to the surface while immersed under water a mixture of (1) a liquid glycidyl polyether of 2,2-bis(4-hydroxyphenyl)propane, (2) from 5% to 50% stoichiometric excess of diethylene triamine, and (3) a finely divided colloidal silicon-containing material, and allowing the mixture to cure while the surface is under water.

19. A process for forming a corrosion-resistant coating on a metal surface which is located in a body of water and extends above and below the water line, the portion above the water line being subjected to frequent splashing of water by wave action, which comprises applying to the wet metal surface above and below the water line a mixture of a liquid polyepoxide containing only members of the group consisting of carbon, hydrogen, oxygen and chlorine and having more than one vic-epoxy group and at least 5% stoichiometric excess of a polyamine, said polyamine having a greater affinity to the metal surface than the water and functioning as to replace the water from the surface of the metal and cure the polyepoxide, and allowing the said mixture containing the polyepoxide and polyamine to harden.

20. A process as in claim 19 wherein the polyepoxide is a glycidyl polyether of an unsubstituted polyhydric phenol having an epoxy equivalency of more than 1.0 and a molecular weight between 250 and 900.

(References on following page)

References Cited in the file of this patent

UNITED STATES PATENTS

| | | |
|---|---|---|
| 2,552,469 | Sweeney | Sept. 12, 1950 |
| 2,705,223 | Renfrew et al. | Mar. 29, 1955 |
| 2,829,984 | Yaeger | Apr. 8, 1958 |
| 2,938,004 | De Hoff et al. | May 24, 1960 |
| 2,941,003 | Shokal | June 14, 1960 |
| 2,944,036 | Floyd et al. | July 5, 1960 |
| 2,951,824 | Bruin et al. | Sept. 6, 1960 |
| 2,965,609 | Newey | Dec. 20, 1960 |
| 2,967,172 | Hood | June 3, 1961 |
| 2,986,539 | Schniepp et al. | May 30, 1961 |
| 2,987,492 | Pinder | June 6, 1961 |
| 3,002,941 | Peterson | Oct. 3, 1961 |
| 3,012,487 | Mika | Dec. 12, 1961 |

OTHER REFERENCES

"Epoxy Resins" Skeist (1958) Reinhold Publishing Corp.

Lee et al.: "Epoxy Resins," McGraw-Hill, 1957, TP 986. E6 L4 (pages 63–114, 64, 148, 169, 171, 204, 269, 271, 275).

Proceedings of the International Patent Office Workshop on Information Retrieval, U.S. Dept. of Commerce, pp. 147 to 154, T233 P2L4.

Glaser et al.: "Coatings Based on Blends of Polyamide and Epoxy Resins," Official Digest, February 1957, pp. 159–169.